Fig. 1

INVENTOR.
Robert M. VanHouse
HIS ATTORNEY

Fig. 4

United States Patent Office 3,334,548
Patented Aug. 8, 1967

3,334,548
VEHICLE BRAKE SYSTEM
Robert M. Van House, Dayton, Ohio, assignor to General Motors Corporation, Detroit, Mich., a corporation of Delaware
Filed Apr. 26, 1963, Ser. No. 275,834
24 Claims. (Cl. 91—391)

The invention relates to a vehicle braking system and more particularly to one which is normally operated by a fluid pressure servo but may be manually operated upon failure of fluid power. The system is particularly adapted to provide a minimum travel brake pedal for power actuation in which the brake pedal is moved only a small amount sufficient to actuate the valving for controlling the power servo. In such systems it is desirable to mount the brake pedal as low as possible so that it does not project above the vehicle floorboard to any adverse extent, but can be positioned at about the same level as the accelerator pedal so that the operator can easily move his foot from one of the pedals to the other. At the same time the invention permits the operator to have full manual control of the brakes throughout the entire breaking range when it is necessary to actuate the vehicle brakes without power. In order to accomplish this, the brake pedal is raised to a high pedal position to increase the available pedal stroke for manual operation. At the same time the pedal lever ratio for manual operation is increased as compared to the pedal lever ratio for power operation so as to apply sufficient force to operate the master cylinder without the benefit of power.

A system embodying the invention preferably utilizes pressurized fluid which is available for power brake operation to hold the brake pedal in the low pedal position. Thus when the supply of pressure falls below a predetermined minimum, the brake pedal is raised and the manual brake applying system is rendered operative. Features of the invention include the provision of controlling the brake pedal movement between the high and low pedal positions so that a deliberate movement is obtained rather than a snap action. Thus the pedal can be raised upon power failure without the possibility of injuring the operator's foot by slamming the pedal against it. Similarly, when the pedal is to be moved to the low pedal position, the pedal moves sufficiently slow to prevent it from forcibly hitting the pedal operator's foot should his foot happen to be underneath the pedal when fluid pressure is suddenly applied.

Figure 1:
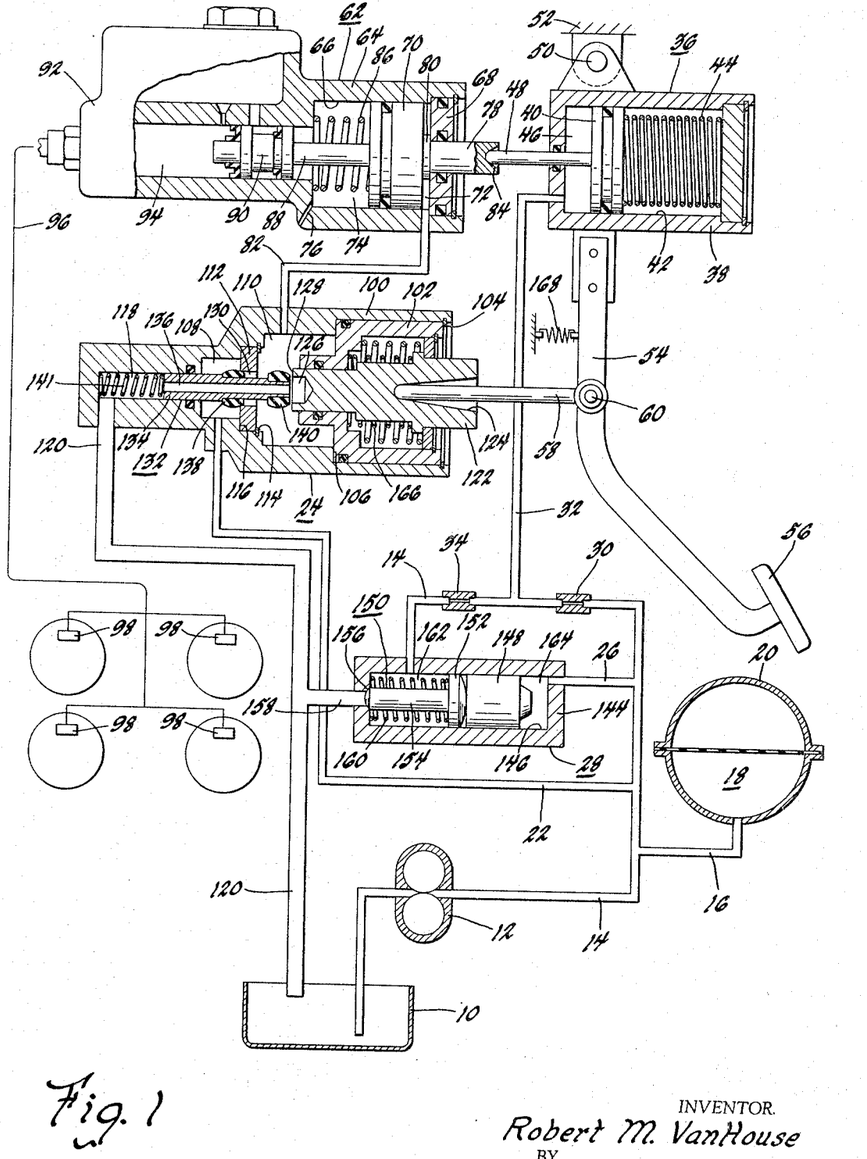
FIGURE 1 is a schematic representation of a brake system embodying the invention, with parts broken away and in section.

FIGURE 1 is a schematic representation of a vehicle brake system employing the invention. The system includes a fluid reservoir 10 from which fluid is pumped by pump 12. The pressurized fluid is delivered to conduit 14 from the pump. A branch conduit 16 connected with conduit 14 permits the pressurized fluid to charge the fluid chamber 18 of the accumulator 20. A pressure supply conduit 22 conducts the pressurized fluid to the booster valve assembly 24 from conduit 14. Another conduit 26 connects one side of the dump valve assembly 28 with conduit 14. A restriction 30 is then positioned in conduit 14 beyond the connection with conduit 26, after which a pedal positioning servo supply conduit 32 is connected with conduit 14. Beyond the connection of conduit 32, a second restriction 34 is positioned in conduit 14 and the conduit then is connected with another portion of the dump valve assembly 28. Conduit 32 is connected to the pedal positioning servo 36. This servo includes a housing 38 in which a piston 40 is reciprocably received in the housing cylinder 42. A compression spring 44 in one end of cylinder 42 urges piston 40 to the left as seen in the schematic diagram. The chamber 46 on the other side of piston 40 from spring 44 receives pressurized fluid from conduit 32. A push rod 48 connected to piston 40 extends through chamber 46 and out of the housing 38. The housing 38 is pivoted at 50 at a suitable portion 52 of the vehicle and is secured to the brake pedal arm 54 so that it supports the pedal arm in a pendant position. A pedal 56 is provided in the lower end of arm 54 for engagement by the foot of the vehicle operator. A second push rod 58 is pivoted at 60 to arm 54 and extends to the booster valve assembly 24. Push rod 48 extends to the master cylinder and power unit assembly 62. Assembly 62 includes a housing 64 in which the power servo cylinder 66 is formed. A closure element 68 is received in one end of cylinder 66. The power piston 70 is mounted for reciprocation in cylinder 66 so that it divides the cylinder into a pressure chamber 72 and an exhaust chamber 74. Vent 76 vents chamber 74 to atmosphere. A plunger 78 is reciprocably mounted in closure element 68 and has a head 80 which is engageable with piston 70 on the pressure chamber side thereof and engages closure element 68 when the brakes are released so as to provide a stop for piston 70. A conduit 82 connects the booster valve assembly 24 with chamber 72. Plunger 78 is aligned with push rod 48 and the plunger end of the push rod 48 is positioned in a depression 84 in the outer end of plunger 78 to maintain the rod 48 in the proper location position. When the system has the pedal 56 in the low pedal position illustrated in FIGURE 1, rod 48 has a slight clearance relative to the bottom of depression 84 so that slight brake actuating movements of the pedal 56 are permitted without transmitting any pedal force through push rod 48 to plunger 78. A power piston return spring 86 is positioned in chamber 74 and urges piston 70 toward plunger head 80. A piston rod 88 is connected with the master cylinder piston 90 in the master cylinder unit 92 so that leftward movement of piston 70 causes piston 90 to pressurize brake fluid in the master cylinder pressure chamber 94. Pressurized brake fluid is delivered through the brake line 96 to the wheel brakes 98 to actuate the vehicle brakes.

The booster valve assembly 24 includes a housing 100 in which the plunger guide 102 is mounted. The guide is held in place by a snap ring 104 and the shoulder 106 formed on the interior of housing 100. The housing 100 also defines a pair of valve chambers 108 and 110 which are separated by an annular valve seat 112 held in place by a snap ring 114 and the shoulder 116 at the end of chamber 108 facing chamber 110. A cylinder 118 in the form of a recess is provided in the end of housing 100 adjacent chamber 108 and is connected to the exhaust conduit 120 which returns fluid to the reservoir 10. The plunger 122 is slidably received in the guide 102 and has its outer end provided with a tapered recess 124 which receives one end of push rod 58. The other end of plunger 122 extends into chamber 110 and has a recess 126 therein so that an annular valve seat 128 is formed by the end of the plunger. The valve seat 112 is annular in form and the aperture 130 provided therethrough preferably has the same diameter as recess 126. The valve assembly 132 includes a valve sleeve 134 reciprocably received in cylinder 118 and extending through chamber 108 and aperture 130 and into chamber 110. A passage 136 is provided throughout the length of sleeve 134. Valve 138 is secured about sleeve 134 and is positioned within chamber 108 so that it can contact valve seat 112 at the aperture 130 to close that aperture. Valve 140 is positioned on one end of sleeve 134 in chamber 110 and has one side thereof engageable with valve seat 128. A valve spring 141 in cylinder 118 urges the valve assembly 132 to the right so that valve 138 normally closes aperture 130. In the brake released position valve seat 128 is spaced from valve 140. The pressure supply conduit 122 is connected with chamber 108 and the power servo conduit 82 is connected with chamber 110.

The dump valve assembly 28 includes a housing 144 having a cylinder 146 formed therein in which is reciprocably received the dump valve piston 148 and the valve 150. Valve 150 has a head 152 engageable with the piston 148 and a shank 154 extending away from piston 148 and terminating in a valve seat contact surface which is in alignment with and engageable with the valve seat 156 formed on housing 144. An exhaust conduit 158 provides fluid communication from valve seat 156 to the exhaust conduit 120. The valve spring 160 is received about valve shank 154 and urges the valve away from valve seat 156. Valve 150 is positioned in a chamber 162 on one side of piston 148 and another chamber 164 is located on the other side of piston 148. Chambers 162 and 164 are parts of cylinder 146. Conduit 26 is connected with chamber 164 and the end of conduit 14 is connected with chamber 162.

During normal vehicle operation with the brake in the released position and with fluid pressure supplied by pump 12, accumulator 20 maintains a full pressure charge and a suitable bypass valve of pump 12 limits the pressure in conduit 14 and the elements connected thereto. Thus, chamber 164 of the dump valve assembly 28 is pressurized, holding the piston 148 and valve 150 to the left so that valve seat 156 is closed. Chamber 162 of the dump valve assembly 128 is also pressurized by the differential area of valve 150 and the force of spring 160 is insufficient to overcome the force of piston 148. Chamber 46 of the pedal positioning servo 36 is also pressurized so that spring 44 is compressed as shown in FIGURE 1 and the housing 38, pedal arm 54, and pedal 56 are in the low pedal position shown. Chamber 108 of the booster valve assembly 24 is also pressurized. The pressure chamber 72 of the power booster unit is connected to exhaust through conduit 82, chamber 110, booster valve assembly 24, passage assembly 136 and exhaust conduit 120.

When the vehicle brakes are to be applied with power boost, the pedal 56 is pushed to the left by the operator, moving the pedal arm 54 about the pivot 50. Due to the slack between push rod 48 and plunger 78, this has no effect on plunger 78. However, push rod 58 is also moved to the left to move booster valve plunger 122 to the left against the plunger return spring 166. This movement closes valve 140 against valve seat 128 and further movement opens valve 138 relative to valve seat 112. Valve 140 cannot move sufficiently far to contact valve seat 112 due to the solid length of spring 141. Thus, sudden full application of the brake pedal will not prevent brake application by closing off aperture 130 with valve 140. Thus the pressure chamber 72 of the booster is first closed to exhaust and is then opened to pressure existing in chamber 108 and supplied by pump 12. The pressure from chamber 108 passes through aperture 130 and chamber 110 to conduit 82 into chamber 72 and acts on the power piston 70, moving piston 70 to the left. Thus, the master cylinder 92 is energized to pressurize fluid at the wheel brakes 98. Due to the valve construction and linkage arrangement, only a small movement of pedal 56 in the brake applying direction is required to accomplish this result. A proportional reaction is obtained by the operator since the end of plunger 122 extending into chamber 110 is subjected to boost pressure in that chamber and therefore transmits a force generated by this pressure to the pedal 56 through the plunger 122, the push rod 58 and the pedal arm 54.

When the brakes are applied to the desired amount, pedal 56 is permitted to move slightly in the brake release position under influence of the plunger return spring 166 and the reaction pressure until valve 138 closes against valve seat 112. This is the poised position wherein pressure is held within chamber 72 to hold the brakes applied.

Upon release of the brake pedal 56, plunger spring 166 moves the plunger 122 to the right and returns the pedal to the brake release position. This also opens valve seat 128 relative to valve 140 and vents booster pressure chamber 72 to the fluid reservoir 10. The power piston return spring 86 then moves piston 70 to the right, moving master cylinder piston 90 with it to release the brake apply pressure.

If for any reason the pump 12 fails to supply pressure sufficient to actuate the booster or to maintain the pedal positioning servo in the low pedal position, the force of spring 160 in dump valve assembly 28 acts to open valve 150 relative to valve seat 156. This permits the pressure in chamber 162 to be immediately exhausted and the pressure in the pedal positioning servo chamber 46 to be more slowly exhausted through restriction 34. Thus the pedal 56 slowly rises as compression spring 44 of the pedal positioning servo pushes against the piston 40 to cause housing 38 to pivot about pivot 50. The rising movement of pedal 56 and pedal arm 54 removes push rod 58 from a force transmitting relationship with plunger 122 while the spring force acting on piston 40 moves push rod 48 into force transmitting engagement with plunger 78. At this time any brake actuating movement of pedal 56 by the operator, causing the pedal arm 54 and the pedal positioning servo housing 38 to pivot about pivot 50, is transmitted through spring 44, piston 40 and push rod 48 to plunger 78. This moves the booster piston 70 to actuate the master cylinder against the force of the booster piston return spring 86. Due to the raising of pedal 56, there is sufficient pedal stroke to provide for satisfactory brake actuating pressure generation in the master cylinder pressurizing chamber 94. Due to the close proximity of push rod 48 to the pivot 50 relative to the pedal 56, an advantageous mechanical ratio is obtained for actuating the master cylinder manually.

When the pump 12 is again operative to supply pressure to the various conduits connected with conduit 14, accumulator 20 is again charged, dump valve assembly 148 is moved to the left to close the dump valve 150 against valve seat 156 and fluid pressure is again delivered to the booster valve chamber assembly 108. Pressure is also delivered to the pedal positioning servo chamber 46 to compress the spring 44 and permit the pedal to be returned to the low pedal position. This pedal position either may be accomplished due to the weight of the servo 36, the pedal arm 54 and the pedal 56, or a suitable light spring 168 may be utilized which is just sufficiently strong to reengage push rod 58 in a force transmitting relation with plunger 122 but not sufficiently strong to overcome the force of plunger return spring 166.

Figure 2:
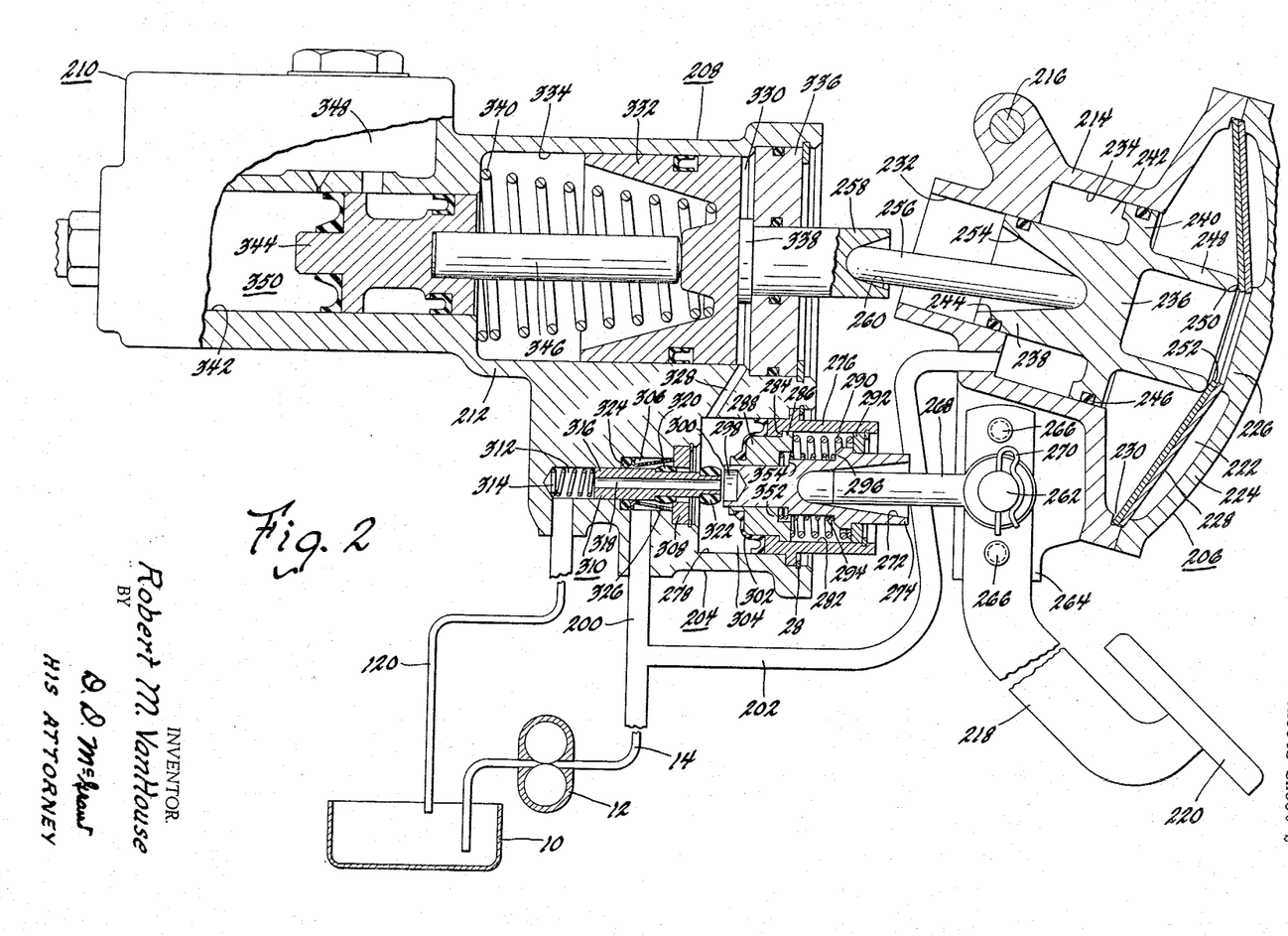
FIGURE 2 is a schematic representation of a modified system embodying the invention, with parts broken away and in section and showing the system in a condition of operation where power is available but the brakes are not actuated.
Figure 3:
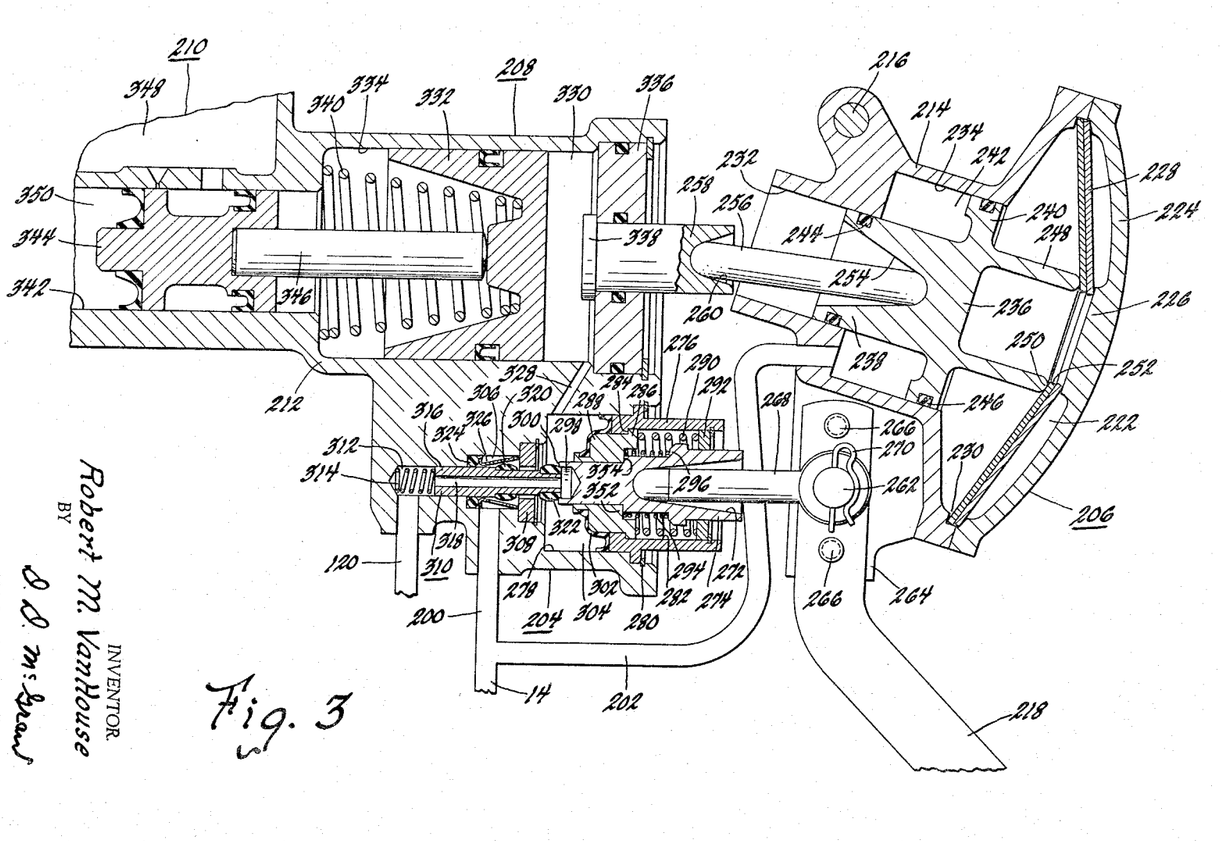
FIGURE 3 is similar to FIGURE 2 and shows the system with the master cylinder being energized through the power servo.
Figure 4:
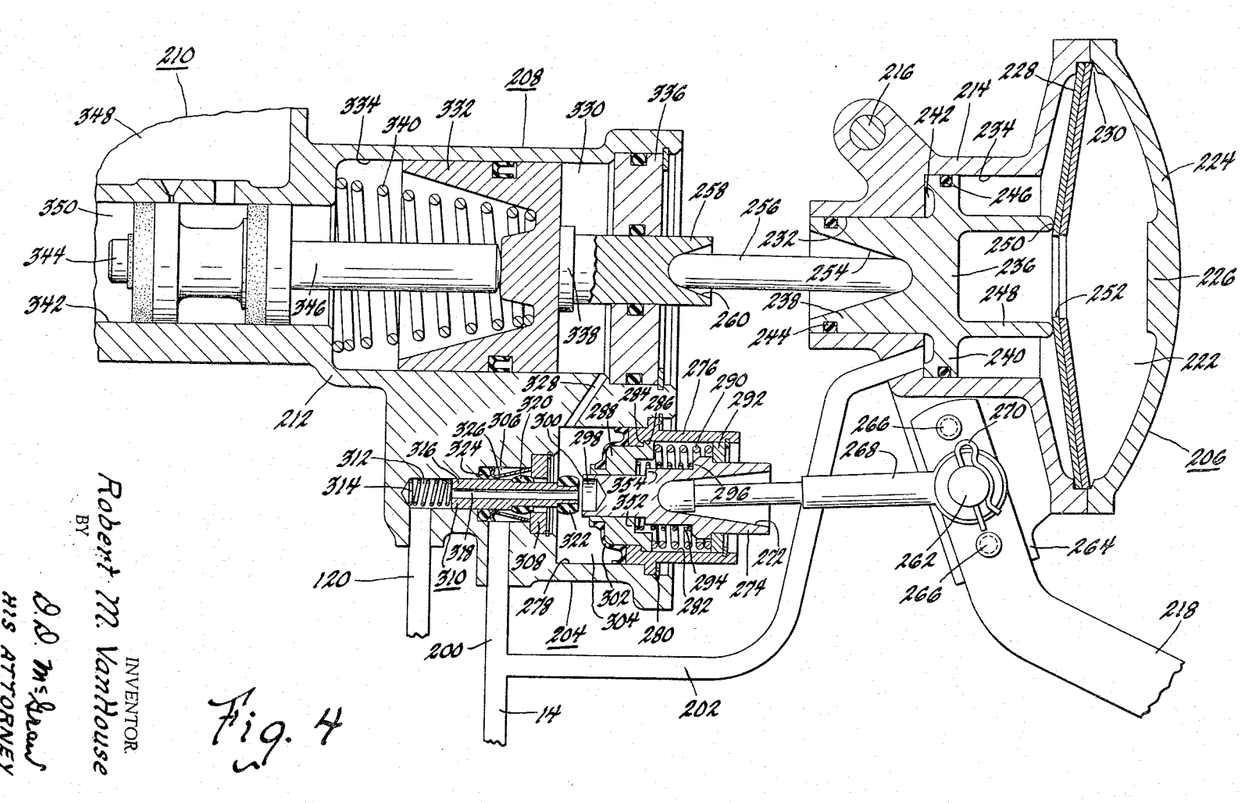
FIGURE 4 is similar to FIGURE 3 but shows the system being manually energized due to failure of power pressure.

FIGURES 2, 3 and 4 show a modified system, with the power unit, booster valve assembly and pedal positioning servo components being illustrated less schematic in form than in FIGURE 1. The system utilizes the reservoir 10 and the pump 12 which delivers pressurized fluid to the conduit 14. This conduit branches into two conduits 200 and 202, with conduit 200 conducting pressurized fluid to the booster valve assembly 204 and 202 conducting pressurized fluid to the pedal positioning servo 206. The drain conduit 120 returns fluid from the booster valve assembly to the reservoir 10.

In this modification the power unit 208, the master cylinder assembly 210 and the booster valve assembly 204 are provided with a common housing 212. The pedal positioning servo assembly 206 has a housing 214 which is provided with a pivot 216 suitably attached to a portion of the vehicle body so that the pedal arm 218, attached to housing 214, and the brake pedal 220 are suspended in a pendant manner.

The servo assembly 206 is provided with a spring chamber 222 which is closed by the spring chamber cover 224 secured to housing 206. A spring stop boss 226 formed on cover 224 receives the Belleville spring pack 228 at its inner annulus, with the outer annulus of the spring pack being received at annular recess 230 provided at the mating surfaces of housing 206 and cover 224. Housing 206 is provided with a first cylinder 232 at the end thereof opposite chamber 222 and a centrally positioned cylinder 234 concentric with and adjacent cylinder 232. Cylinder 234 is the larger of the two cylinders. A piston 236 has the piston end 238 reciprocably received in cylinder 232 and the enlarged piston section 240 reciprocably received in cylinder 234. Clyinder 234 and piston 236 cooperate to define pressure chamber 242, with suitable piston seals 244 and 246 respectively sealing the piston in relation to cylinders 232 and 234. An annular piston extension 248 extends from piston section 240 into the spring chamber 222 and terminates in an annular spring seat 250 which engages spring pack 228 adjacent the inner spring aperture 252. Piston end 238 is provided with a tapered recess 254 which is rounded at the bottom to receive the mating rounded end of push rod 256. Push rod 256 extends outwardly through cylinder 232 and engages a plunger 258 in the tapered and rounded bottom recess 260 formed in the plunger end. The rounded bottom of recess 260 mates with the rounded end of push rod 256.

A pivot 262 is provided on the pedal arm mounting flange 264 of housing 214 and preferably extends through the upper end of the pedal arm 218. The pedal arm is additionally located and secured to housing 214 by suitable fastening members 266. A push rod 268 has one end pivotally mounted to pivot 262 and secured in position by the key 270. The outer end of push rod 268 engages the rounded bottom of the tapered recess 272 of valve actuating plunger 274. The push rod 268 is illustrated as having an extending and collapsing construction, with the extended position being shown in FIGURE 4. The collapsed position shown in FIGURES 2 and 3 results when the brake pedal is in the low position, and a relatively light spring is provided within the push rod 268 to extend it in the manner shown in FIGURE 4 when the brake pedal is moved to the high pedal position. This is provided to keep the push rod suitably positioned in recess 272 while the pedal is in the high position so that it may readily be positioned for operation when the pedal is returned to the low pedal position.

Booster valve assembly 204 includes a reaction piston guide 276 which extends into booster valve assembly cylinder 278 formed in housing 212 and is located in that cylinder by a shoulder formed on the housing and a snap ring 280. Guide 276 has a cylinder 282 formed within it which terminates in a reduced section to provide a suitable annular shoulder 284 against which the annular shoulder 286 of the reaction piston 288 abuts when the piston is positioned at the shoulder end of cylinder 282. Piston 288 is reciprocably mounted in cylinder 282 and is urged to the left as seen in the drawings by the reaction piston spring 290 acting against the reaction piston and the spring retainer 292. Piston 288 is generally annular in form and reciprocably receives the left end of plunger 274 therethrough. A plunger spring 294 reacts against piston 288 and a shoulder 296 on plunger 274 to urge the plunger to the right against push rod 268 until shoulder 296 engages the spring retainer 292. The left end of plunger 274 is provided with a recess 298 so that the annular outer end surface of the plunger provides a valve seat 300. An annular reaction piston diaphragm 302 is secured at its inner annulus about the left end of piston 288 and follows the contour of the piston with the outer circumference of the diaphragm being positioned against the end of the reaction piston guide 276 adjacent guide shoulder 284. Cylinder 278 therefore cooperates with the diaphragm 302, reaction piston 288 and plunger 274 to define a chamber 304. A reduced diameter cylinder 306 extends from cylinder 278 in housing 212 to which conduit 200 is connected. An annular valve seat 308 is secured against a shoulder at the end of cylinder 306 adjacent cylinder 278. A valve assembly 310 is positioned in cylinders 278 and 306 and a third cylinder 312 of reduced diameter in relation to cylinder 306 and formed at one end thereof. A valve spring 314 is provided in cylinder 312 and urges the valve assembly to the right. The valve assembly 310 includes a valve sleeve 316 through which passage 318 is formed, a valve 320 mounted on sleeve 316 and positioned in cylinder 306 and engageable with seat 308, and valve 322 mounted on one end of valve sleeve 316 and engageable with the valve seat 300 formed on the end of plunger 274. A suitable seal 324 and apertured seal retainer 326 are provided in cylinder 306 to seal the valve sleeve 316 and prevent leakage between cylinders 306 and 312. Drain line 120 is connected with the cylinder 312.

A passage 328 in housing 212 connects the chamber 304 with a pressure chamber 330 in the power unit 208. The pressure chamber 330 is defined by the power piston 332, which is reciprocably mounted in the cylinder 334 formed in housing 212, the right end of cylinder 334, the closure element 336 secured in the right end of cylinder 334, and the head 338 of plunger 258. Plunger 258 is reciprocably mounted in closure element 336 so that its head 338 is engageable with the power piston 332 when insufficient fluid pressure is in chamber 330 to move piston 332 to the left. A power piston return spring 340 is received in cylinder 334 and urges the power piston 332 to the right against plunger head 338. The master cylinder assembly 210 includes the cylinder 342 formed in housing 212 in which is received the master cylinder piston 344 which is actuated by the power piston 332 through the push rod 346 extending between piston 332 and piston 344. The housing 212 may include a suitable brake fluid reservoir 348. The pressure chamber 350 of the master cylinder is suitably connected to the wheel brakes for brake actuation in the usual manner.

The modified system is shown in FIGURE 2 with the brake pedal 220 in the low pedal position and the brakes released. FIGURE 3 shows the system with the brakes applied by means of the power unit 208 under control of the booster valve assembly 204. FIGURE 4 shows the system of FIGURE 2 with the brakes applied without power boost from a high pedal position.

When the system is in the condition shown in FIGURE 2, pump 12 is furnishing pressure to conduit 202 and chamber 242. The pump is provided with a suitable pressure relief control so that the pressure is maintained at a desired limit. Valve 320 is seated on seat 308 so that pressure does not pass beyond cylinder 306 in the booster valve assembly. The pressure in chamber 242 acts against the piston enlarged section 240 and moves piston 236 to the right against the spring pack 228 until the spring engages the spring stop 226. This causes the pedal positioning servo assembly 206 to move clockwise about pivot 216 to move pedal 220 to the low pedal position. The push rod 268 is collapsed so that it acts as a solid force transmitting member. Push rod 256 is of such a length that it is not in a force transmitting relation to plunger 258 and piston 236 although it is in a position to be in such a relation should the boost pressure fail.

Slight movement of pedal 220 in the brake actuating direction moves plunger 274 to the left by push rod 268 to close valve seat 300 against valve 322 and cut off the exhaust connection of chamber 330 to the drain line 120 through passage 318. Slight additional movement of the pedal 220 opens valve 320 in relation to valve seat 308 and pressurized boost fluid in cylinder 306 flows through the valve seat 308 into chamber 304 and through passage 328 into pressure chamber 330 of the power unit. The fluid under pressure in chamber 304 acts against diaphragm 302 and urges reaction piston 228 to the right against the force of springs 290 and 294. Fluid also acts against a small annular part of the end of plunger 274 to provide initial reaction feel. As the pressure builds up in chamber 304, spring 290 is compressed by movement of piston 288 and reaction force is transmitted from the piston to the plunger 274 through the spring 294 until a shoulder 352 on piston 288 engages a mating shoulder 354 on plunger 274 at which time the reaction force is then transmitted directly from the piston to the plunger. The pressurized fluid in chamber 330 moves piston 332 to the left while holding plunger 258 in the right position shown. The movement of power piston 332 actuates the master cylinder assembly to pressurize fluid in the brake lines and actuate the vehicle brakes.

When the brakes have been applied to the desired amount the brake pedal is slightly released until valve 320 again seats on valve 308 and the poised position of the assembly is obtained. To release the brakes the pedal 220 is permitted to move to the brake release position and plunger 274 then moves to the right under influence of plunger return spring 294 to remove valve seat 300 from valve 322 and vent pressure chamber 330 to the reservoir 10 through passage 328, chamber 304, valve passage 318, cylinder 312, and drain line 120. The power piston return spring 340 then moves the power piston to the right and the master cylinder is returned to the brake release condition.

If for any reason the pressure in conduit 202 fails, the Belleville spring pack 228 will force the pedal positioning servo piston to the left, causing push rod 256 to engage in a force transmitting relation with plunger 258 and piston 238 and moving the pedal positioning servo 206, the pedal arm 218 and the pedal 220 counterclockwise about pivot 216 to the general position shown in FIGURE 4. Push rod 268 extends to maintain its position so that it will be ready to operate booster valve assembly 204 when the pressure is restored. When the brakes are to be applied manually, the pedal 220 is pushed downwardly to pivot the pedal positioning servo assembly 206 clockwise about pivot 216. Spring pack 228 is sufficiently strong to transmit the forces required to actuate the brakes from the housing 214 to the piston 236 without collapsing. Thus the force is transmitted to the plunger 258 through the push rod 256 when the brake pedal is moved. Plunger head 338 acts against the power piston 332 and the brake pedal force is mechanically transmitted to the master cylinder piston 344 through the push rod 346 against the force of spring 340. This brake apply position is shown in FIGURE 4.

When the pressure is again available in conduits 200 and 202, it acts against the piston 236 to return the pedal 220 to the position shown in FIGURE 2 and the system is once again in condition for power boost operation.

Figure 5:
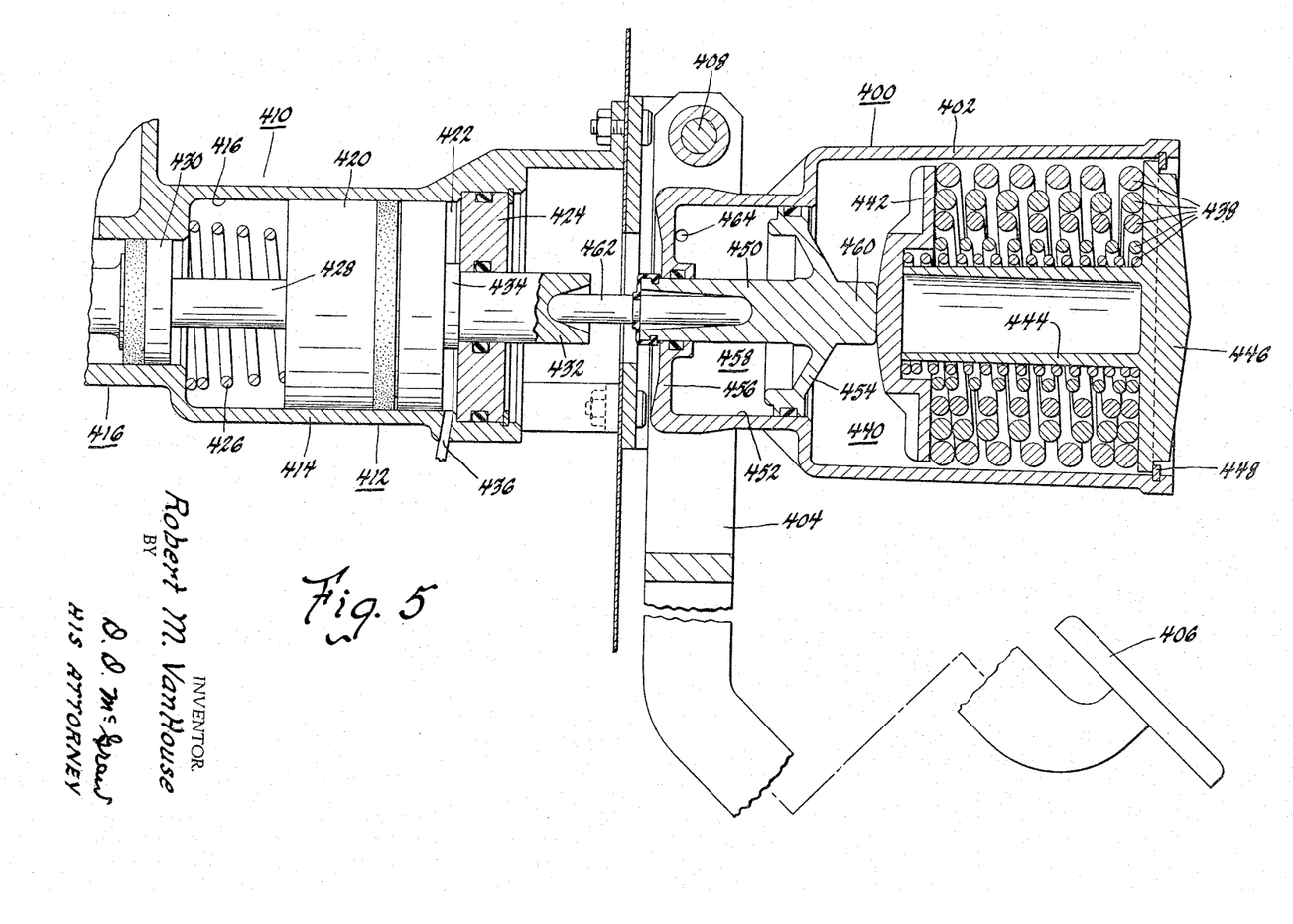
FIGURE 5 is generally similar to FIGURE 2 and shows a third modification of the system.

FIGURE 5 illustrates a modified system utilizing a somewhat different type of spring pack for the pedal positioning servo assembly. The modified pedal positioning servo assembly 400 includes a housing 402 which is secured to the brake pedal arm 404 on which the brake pedal 406 is mounted. Arm 404 is pivotally attached to a suitable portion of the vehicle body at pivot 408 so that it is supported in the usual pendant position. The power unit and the master cylinder are provided as one assembly 410 and are positioned generally in line with the pedal positioning servo assembly 400. The assembly 410 includes the power unit 412 within the housing 414. The master cylinder unit 416 is also formed within the housing 414. The power cylinder 418 has the power piston 420 reciprocably received therein so that a pressure chamber 422 is provided at one end of the cylinder 418. Chamber 422 is closed by the closure element 424 which is suitably secured to housing 414. The piston 420 is urged to the right by the return spring 426. A push rod 428 connects piston 420 with the master cylinder piston 430 to transmit forces between the two pistons. Plunger 432 is slidably mounted in closure element 424 so that the plunger head 434 extends into chamber 422 and is engageable with piston 420. The head 434 maintains a minimum chamber width so that the pressure passage 436 is always open to chamber 422 and power unit pressure can be applied and moved from the chamber at all times.

The pedal positioning servo assembly 400 includes a spring pack 438 which is illustrated as being formed of five concentric compression springs. The spring pack is received in the spring power chamber 440 formed in housing 402 so that the springs engage the spring plate 442. The springs are received about the spring guide section 444 of the spring pack cover and guide member 446, which closes the open end of chamber 440 and is retained in place by the snap ring 448. The end of guide 444 also acts as a spring plate stop which prevents the compression of the spring pack beyond a desired point. Spring pack 438 is compressed to the position shown by movement of the pedal positioning servo piston 450 in the cylinder 452 also formed in housing 402. Cylinder 452 and the enlarged section 454 of piston 450 cooperate with the end wall 456 to define the pressure chamber 458. Piston 450 is provided with a suitable extension 460 which engages the spring plate 442 to transmit forces from the piston to the spring pack. Piston 450 is mounted for reciprocation in cylinder 452 in such a manner that it extends outwardly of the end wall 456 to provide for the reciprocation of the push rod 462. This push rod engages the plunger 432 to transmit forces between the plunger and the piston 450. Pressure is supplied to the chamber 458 through a suitable pressure aperture 464 in a similar manner to the systems of FIGURES 1 and 2. A suitable booster valve assembly also controls the admission and exhaust of pressure to and from chamber 422 of the power unit.

The operation of the system of FIGURE 5 is generally similar to that of the earlier modification. However, this system has certain manufacturing and performance advantages in the use of a compression spring pack which occupies less space than the Belleville spring pack of FIGURE 2. It also permits the high pack loading necessary to transmit the manual braking force therethrough without compression of the pack when there is no power supplied to the power unit 412. As before, the manual forces exerted for actuation of the brakes pass through the spring pack 438 and these springs must be sufficiently strong to transmit these forces without compression. At the same time the pressure forces exerted in chamber 458 on piston section 454 must be sufficiently great to collapse the spring pack to the desired extent.

Figure 6:
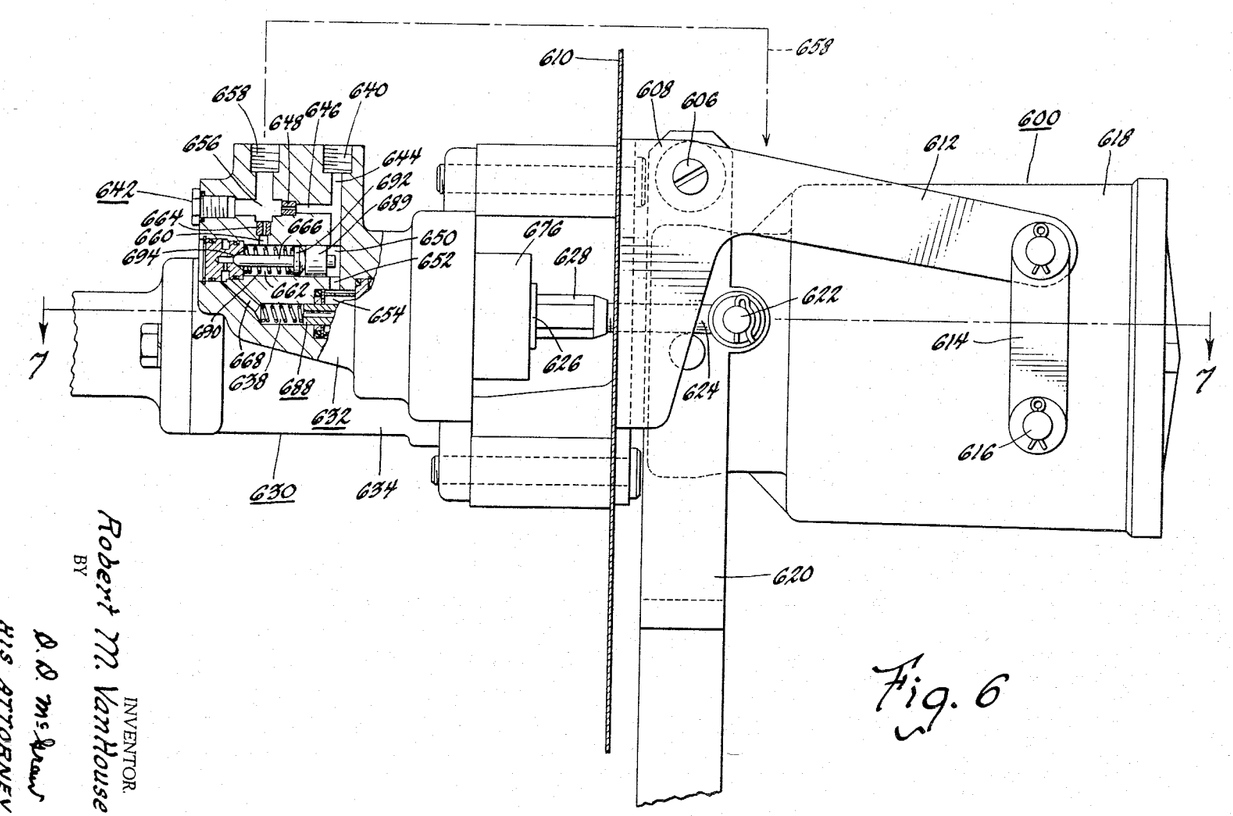
FIGURE 6 is a view with parts broken away and in section of a fourth modification of mechanism embodying the invention and adapted for utilization in a system such as that disclosed in the schematic diagram constituting FIGURE 1.
Figure 7:
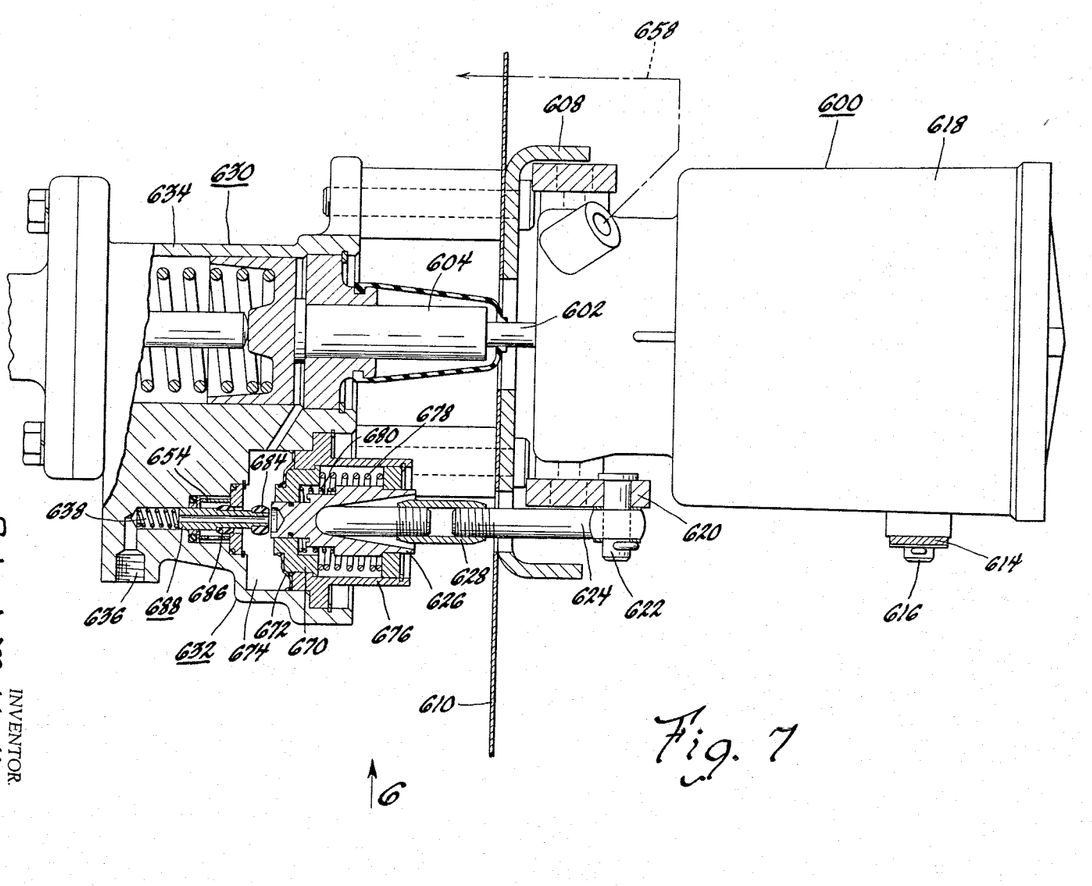
FIGURE 7 is a partial section view with parts broken away and taken in the direction of arrows 7—7 of FIGURE 6.

FIGURES 6 and 7 show the booster valve, power unit and dump valve assemblies incorporated in a pedal raising device and utilizing the schematic system of FIGURE 1. In this instance the pedal positioning servo assembly 600 is supported on a parallelogram linkage arrangement so that it maintains the push rod 602 in substantial alignment with the plunger 604 instead of the pivotal type movement that would occur in the schematically disclosed mechanism of FIGURE 1. In this instance the pivot 606 is attached to a bracket 608 which is secured to a suitable portion of the vehicle body such as the firewall 610. Bracket 608 has a leg 612 extending rearwardly and a parallelogram link 614 is pivoted to the end of the leg at one end. The other end of link 614 is pivotally connected at 616 to the housing 618. Pedal arm 620 is attached to the pivot 606 so that the pivot 622 on the pedal arm for push rod 624 is in alignment with the plunger 626. A suitable adjusting element 628 may be provided as a part of push rod 624.

The power unit 630 and the booster valve assembly 632 are received in a common housing 634, with the exhaust conduit 636 being connected to the chamber 638. The conduit 640 is connected to the dump valve assembly 642 so that it conducts fluid to the passage 644 from the pump 12 of FIGURE 1 with a branch passage 646 leading to the restrictive orifice 648. Passage 644 connects with the dump valve chamber 650 and the passage 652 connects chamber 650 with the valve chamber 654. Beyond restriction 648 is a passage 656 to which is connected the conduit 658 leading to the pedal positioning servo assembly 600. A passage 660 connects passage 656 with the chamber 662 of the dump valve assembly through the restriction 664. The valve 666 of the dump valve assembly controls exhaust from chamber 662 to the exhaust conduit 636 through the passage 668 which is in fluid communication with chamber 654.

The booster valve assembly 632 is generally similar to the booster valve assembly 24 of FIGURE 1 but includes a reaction piston 670 and a reaction diaphragm 672 so that pressurized fluid in chamber 674 acts on the piston through the diaphragm to move the piston in the plunger guide 676 against the force of the reaction piston spring 678 and the plunger return spring 680 to transmit reaction forces to the plunger 626 first through the spring 680 and then by engaging a shoulder on the plunger. Valves 684 and 686 of valve assembly 688 control the booster pressure in the same manner as do the similar valves in FIGURE 1.

Pedal height control is accomplished by dumping the pressurized fluid from the pedal positioning servo chamber and from the accumulator when the accumulator pressure drops below a predetermined pressure. So long as there is pressure from pump 12 or the accumulator acting on both sides of the dump piston 689 with equal force and on the valve 666 with a differential force sufficient to hold the spring 690 compressed, the dump valve 666 keeps chamber 662 disconnected from exhaust. Pressure can act on both sides of piston 689 since the valve head 692 of the valve 666 is so constructed as to permit fluid to flow past the valve and occupy the chamber between the valve head and the piston 689. So long as the pressure in conduit 640 is above the predetermined amount it continues to act on both sides of dump piston 689 with equal force so long as the flow rate through the restrictions 648 and 664 is at or near zero. However, when the pressure in conduit 640 drops sufficiently low, spring 690 opens the valve 666 relative to the valve seat 694 and dumps all of the pressure from the accumulator fluid chamber 18 of FIGURE 1 and the pedal positioning servo chamber. Due to restriction 664 the dumping of fluid from the pedal positioning servo chamber occurs at a slow, deliberate rate rather than at a very quick rate. This eliminates a snap action effect in raising the pedal and provides a slower action rate which will not injure the operator's foot should it be positioned on or immediately above the brake pedal.

When sufficient pressurized fluid is later supplied through conduit 640 the fluid will flow through the restrictions 648 and 664, and initially through the dump valve to drain. However, there will be a pressure drop due to the restrictions so that the pressure will build up in chamber 650 quicker than in chamber 662. This differential pressure acting on piston 689 will move the valve 666 to close valve seat 694, permitting the pump 12 to charge the accumulator and again pressurize the pedal positioning servo chamber, lowering the brake pedal to the low pedal position. Restriction 648 will control the fill rate of the pedal positioning servo chamber and restriction 664 will control the dump rate of the chamber. Thus, when the pedal is lowered the action will also be deliberate rather than a snap action and will prevent possible injury to the operator's foot should it for some reason be underneath the brake pedal at this time.

I claim:

1. In a vehicle braking system, a fluid pressure operated servomotor for actuating a master cylinder assembly, a source of superatmospheric fluid pressure, a valve assembly connected between said pressure source and said servomotor for controlling fluid pressure to said servomotor, a brake pedal assembly connected to said valve assembly and said servomotor and having a high pedal position for manually actuating the master cylinder assembly through said servomotor and a low pedal position for actuating said valve assembly to control said servomotor, said brake pedal assembly including a fluid pressure operated pedal positioning servomotor energized by fluid pressure from said source to maintain said low pedal position so long as fluid at a predetermined minimum pressure is supplied to said valve assembly and having means for positioning said pedal assembly in said high pedal position upon decrease of supply fluid pressure below the predetermined minimum.

2. In the braking system of claim 1, valve means for deenergizing said fluid pressure operated pedal positioning servomotor by releasing pressurized fluid therefrom upon and in response to decrease of supply pressure below the predetermined minimum.

3. In the braking system of claim 1, means restrictively controlling the rate of movement of said brake pedal assembly from said high pedal position to said low pedal position and from said low pedal position to said high pedal position.

4. A brake control system for a hydraulically actuated vehicle brake arrangement including means for pressurizing brake fluid to apply the brakes, said system comprising a positive fluid pressure source, a control valve assembly receiving positively pressurized fluid from said source, a fluid pressure actuated servomotor fluid connected with said control valve assembly for control thereby and adapted to be mechanically connected with the pressurizing means, a brake pedal assembly having a pedal positioning servomotor connected to receive positively pressurized fluid from said source and hold the brake pedal assembly in a low pedal position, means operatively interconnecting the brake pedal assembly and the control valve assembly when the brake pedal assembly is in the low pedal position for actuating said control valve assembly to control said fluid pressure actuated servomotor by controlling positive fluid pressure supplied thereto, said brake pedal assembly being movable by said pedal positioning servomotor to a second pedal position to operatively disconnect said brake pedal assembly from said control valve assembly and to mechanically connect said brake pedal assembly for direct actuation of the pressurizing means.

5. In a brake system having brake means adapted to be selectively actuated, the improvement comprising, a fluid pressure source, a booster valve assembly, conduit means conducting pressurized fluid from said source to said booster valve assembly, a fluid pressure actuated servomotor, conduit means fluid connecting said booster valve assembly and said servomotor, said servomotor being adapted to power actuate the selectively actuated brake means upon fluid pressure energization of said servomotor under control of fluid pressure passing through said booster valve assembly, a brake pedal assembly including a pivotally mounted brake pedal arm having a first push rod secured thereto and mechanically connected to actuate said booster valve assembly in one brake pedal position and operatively disconnected therefrom in another brake pedal position, a fluid pressure pedal positioning servomotor including a housing connected to said brake pedal assembly and having a cylinder formed therein and reciprocably receiving a servomotor piston and a spring in said cylinder urging said piston toward one end of said cylinder, a second push rod operatively interconnecting said piston and said booster servomotor for mechanical transmission of force from said piston through said servomotor and therefore adapted to mechanically actuate the selectively actuated brake means when said brake pedal assembly is in the other pedal position, and conduit means conducting pressurized fluid from said source to said pedal positioning servomotor cylinder to compress said spring in said cylinder by movement of said piston and move said brake pedal assembly to said one pedal position.

6. The system of claim 5, comprising valve means responsive to pressure from said source for dumping pressure from said pedal positioning servomotor when the source pressure falls below the predetermined minimum pressure.

7. The system of claim 6 comprising fluid restriction means intermediate said dumping means and said pedal positioning servomotor and establishing a maximum dumping speed to prevent sudden brake pedal assembly movement.

8. The mechanism of claim 5 further comprising fluid restriction means intermediate said pressure source and said pedal positioning servomotor and establishing a maximum pedal repositioning speed when said servomotor is pressurized.

9. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having a normal position engaging said valve mechanism and movable from such position to operate said valve mechanism, and pedal control means arranged between said pedal and said pressure responsive unit and comprising a normally compressed spring, force transmitting means interposed between one end of said spring and said pressure responsive unit and normally permitting free movement of said pedal to operate said valve mechanism, means subject to pressure in said source for normally maintaining said spring compressed, and valve means interposed between said last named means and said source for connecting said last named means to the atmosphere when pressure in said source drops to a predetermined point whereby said spring will expand to move said force transmitting means into engagement with said pressure responsive unit and establish mechanical connection between said pedal and said pressure responsive unit.

10. A mechanism according to claim 9 wherein said valve means has a first port connected to said source and a second port connected to said last named means and a third port connected to the atmosphere, a pressure responsive element having one end subject to pressure in said first port to be normally held by such pressure in a normal position closing said third port, and means biasing said element for movement toward said first port to a second position in which said second port will be connected to the atmosphere through said third port whereby, when pressure in said source drops to said predetermined point said element will move to said second position.

11. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having a first normal position engaging said valve mechanism and movable from such position to operate said valve mechanism, pedal control means including force generating means operable for moving said pedal to a second normal position disengaged from said valve mechanism and for mechanically connecting said pedal to said pressure responsive unit, said force generating means including movable means having a surface exposed to pressure in said source to normally maintain said force generating means inoperative, and means exposed to pressure in said source and operative when said pressure drops to a predetermined point for exposing said surface to atmospheric pressure.

12. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having a first normal position engaging said valve mechanism and movable from such position to operate said valve mechanism, pedal control means including force generating means operable for moving said pedal to a second normal position disengaged from said valve mechanism, means automatically operative when said pedal is moved to said second normal position for establishing mechanical connection between said pedal and said pressure responsive unit, said force generating means including a movable element provided with a surface exposed to pressure in said source and connected to said force generating means to maintain it inoperative when pressure in said source is above a predetermined pressure higher than atmospheric pressure, and means exposed to pressure in said source and operative when such pressure drops to said predetermined point for exposing said surface to atmospheric pressure.

13. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having a first normal position engaging said valve mechanism and movable from such position to operate said valve mechanism, pedal control means including force generating means operable for moving said pedal to a second normal position disengaged from said valve mechanism and for mechanically connecting said pedal to said pressure responsive unit, said force generating means including movable means having a surface exposed to pressure in said source to normally maintain said force generating means inoperative, and an automatic valve device connected to said source and having a movable member provided with a pressure area exposed to pressure in said source to be normally maintained in a given position in which source pressure is transmitted to said surface, and means biasing said movable member to a second position to which it is movable when pressure in said source drops to a predetermined point for exposing said surface to the atmosphere.

14. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having a first normal position engaging said valve mechanism and from which position it is movable to operate such mechanism, and pedal control means comprising a spring normally compressed and operative when released to move said pedal to a second normal position in which it is disengaged from said valve mechanism, means for establishing mechanical connection between said pressure responsive unit and said pedal when the latter is in said second normal position, pressure operable means subject to pressure in said source for normally maintaining said spring compressed, and valve means subject to pressure in said source and operative when such pressure drops to a predetermined point above atmospheric pressure for subjecting said pressure operable means to atmospheric pressure whereby said spring will be released.

15. A mechanism according to claim 14 provided with chamber means, said pressure operable means having at least one pressure surface exposed to pressure in said chamber means, said valve means normally connecting said chamber means to said source and being operative when pressure in said source drops to said predetermined point for connecting said chamber means to the atmosphere.

16. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having two normal positions in one of which it engages said valve mechanism and from which it is movable to operate said valve mechanism, pedal control means arranged between said pedal and said pressure responsive unit and normally free of said pedal when the latter is in said one normal position for movement of said pedal to operate said valve mechanism, said pedal control means comprising normally relatively axially movable members constituting a force transmitting means, a source of stored energy interposed between said pressure responsive unit and said force transmitting means, said force transmitting means having a portion subject to pressure in said source for maintaining said source of stored energy inoperative, and valve means interposed between said portion of said force transmitting means and said source of pressure and operative upon a drop in such pressure below a predetermined point for exposing said portion of said force transmitting means to atmospheric pressure to release said source of stored energy to effect movement between said axially movable members to move said pedal to said second normal position and to establish mechanical connection between said force transmitting means and said pedal whereby said pedal is movable from said second normal position to transmit force to said pressure responsive unit through said force transmitting means.

17. A mechanism according to claim 16 wherein one of said axially movable members directly engages said pressure responsive unit, said source of stored energy being a normally compressed spring having one end engaging said one axially movable member and the other end engaging the other axially movable member, said other axially movable member, when said spring is released by operation of said valve means, engaging said pedal to move it to said second normal position for the direct operation of said pressure responsive unit by said pedal.

18. A fluid pressure motor mechanism comprising a motor having a casing and a pressure responsive unit forming therewith a pressure chamber, a normally stationary manually operable member movable to actuate said pressure responsive unit, a valve mechanism controlling communication between said pressure chamber and a pressure source and having an operating member, a lever mechanism normally engaging said operating member and having a normal position from which it is movable to move such member and operate said valve mechanism to connect said pressure chamber to said source, said lever mechanism normally having lost motion connection with said manually operable member within the limits of which lost motion said valve mechanism is operable without moving said manually operable member, and means automatically operative upon a failure of pressure in said source for moving said lever to a different normal position and taking up said lost motion connection and for establishing mechanical connection between said lever mechanism and said manually operable member for actuating the latter without moving said operating member.

19. A fluid pressure motor mechanism comprising a motor having a casing and a pressure responsive unit forming therewith a pressure chamber, a normally stationary manually operable member movable to actuate said pressure responsive unit, a valve mechanism controlling communication between said pressure chamber and a pressure source and having an operating member, a lever mechanism normaly engaging said operating member and having a normal position from which it is movable to move such member and operate said valve mechanism to connect said pressure chamber to said source, said lever mechanism normaly being freely movable relative to said manually operable member to move said valve mechanism without moving said manually operable member, said lever mechanism comprising a pedal lever, and means wholly carried by said pedal lever and responsive to a failure of pressure in said source for moving said lever to a different normal position from which it is movable to operate said manually operable member without moving said operating member.

20. A fluid motor mechanism according to claim 19 wherein said means comprises a control device movable relative to said pedal lever, means responsive to pressure in said source for maintaining said control device in a normal position for moving said operating member without moving said manually operable member, and spring means operative upon a failure of power in said source for moving said control device to another position to swing said pedal lever to said different normal position and for establishing mechanical connection between said pedal lever and said manually operable member.

21. A mechanism according to claim 20 wherein said means responsive to a failure of power in said source comprises a cylinder having a pressure responsive element therein connected to said control device, said spring means being arranged in said cylinder and engaging said pressure responsive element to tend to move it in opposition to pressure in said cylinder derived from said source.

22. A fluid pressure motor mechanism comprising a motor having a casing and a pressure responsive unit forming therewith a pressure chamber, a normally stationary manually operable member movable to actuate said pressure responsive unit and arranged coaxial therewith, a valve mechanism controlling communication between said pressure chamber and a pressure source and having an operating member, a lever mechanism mounted to turn as a unit about a pivot axis closer to said manually operable member than to said operating member and having a normal position in which it engages said operating member, said lever mechanism normally having free movement with respect to said manually operable member for the operation of said lever mechanism from said nominal position for moving said operating member, and means wholly carried by and forming a part of said lever mechanism and operable upon a failure of pressure in said source for moving said lever mechanism to a different normal position in which it is substantially spaced from said operating member and mechanically connected to said manually operable member whereby, upon operation of said lever mechanism said manually operable member will be moved to move said pressure responsive unit without moving said operating member.

23. A fluid pressure motor mechanism comprising a motor having a casing and a pressure responsive unit forming therewith a pressure chamber, a normally stationary manually operable member coaxial with said pressure responsive unit and movable to actuate the latter, a valve mechanism for controlling communication between said pressure chamber and a pressure source and having an operating member, said valve mechanism having parts coaxial with said operating member and spaced laterally from the axis of said motor, a lever mechanism pivoted to turn on an axis spaced laterally from the axis of said motor at the side thereof opposite the axis of said operating member, said lever mechanism having a normal position in which it engages said operating member and normally having free movement with respect to said manually operable member for operating said valve mechanism without moving said manually operable member, said lever mechanism being pivoted to turn in the plane of the axes of said motor and said operating member and being mounted to turn to a second normal position substantially spaced from said operating member, and means wholly carried by said lever mechanism and responsive to a failure of pressure in said source for swinging said lever to said second normal position and for connecting it to said manually operable member whereby said lever mechanism is movable from said second normal position to operate said manually operable member and move said pressure responsive unit without engaging said operating member.

24. A brake system comprising: a brake pedal positioning servomotor and a source of fluid pressure and a brake pedal connected to be moved by said servomotor to one position when actuated by fluid pressure from said source and to a second position when fluid pressure is exhausted from said servomotor, means responsive to fluid pressure from said source for exhausting fluid pressure from said servomotor when the pressure of fluid from said source falls below a predetermined minimum pressure which will hold said brake pedal in said one position, first fluid conduit means interconnecting said fluid pressure source and said servomotor and having a first fluid restriction therein limiting the speed of application of fluid pressure to said servomotor, and second fluid conduit means interconnecting said servomotor and said fluid pressure responsive means and having a second fluid restriction therein limiting the speed of fluid pressure exhaust from said servomotor.

References Cited
UNITED STATES PATENTS

| | | | |
|---|---|---|---|
| 1,348,604 | 8/1920 | Titus | 251—62 |
| 1,623,431 | 4/1927 | McVoy | 251—62 |
| 2,848,980 | 8/1958 | Ayers | 188—152 |
| 2,910,147 | 10/1959 | Fishtahler et al. | 188—152 |
| 3,063,427 | 11/1962 | Hill | 60—54.6 |
| 3,074,383 | 1/1963 | Shultz | 91—391 |
| 3,093,120 | 6/1963 | Ayers | 91—391 |
| 3,143,930 | 8/1964 | Ayers | 91—391 |

MARTIN P. SCHWADRON, *Primary Examiner.*

FRED ENGELTHALER, SAMUEL LEVINE,
*Examiners.*

P. E. MASLOUSKY, *Assistant Examiner.*